United States Patent [19]

Mitsuoka

[11] 3,950,693
[45] Apr. 13, 1976

[54] IGNITION APPARATUS FOR THYRISTORS

[75] Inventor: Hiroshi Mitsuoka, Amagasaki, Japan

[73] Assignee: Mitsubishi Denki Kabushiki Kaisha, Tokyo, Japan

[22] Filed: June 19, 1974

[21] Appl. No.: 480,824

[30] Foreign Application Priority Data
June 19, 1973 Japan.................................. 48-68966

[52] U.S. Cl................. 321/27 R; 307/260; 307/264; 307/268; 307/252 J
[51] Int. Cl.²......................................... H02M 7/00
[58] Field of Search........ 307/252 M, 252 J, 252 N, 307/260, 264, 268; 321/11, 27 R; 328/156, 157, 158

[56] References Cited
UNITED STATES PATENTS

| | | | |
|---|---|---|---|
| 3,448,300 | 6/1969 | Gyogyi................................ | 307/252 |
| 3,480,797 | 11/1969 | Bedford et al.................. | 307/252 N |
| 3,646,578 | 2/1972 | Gregory........................... | 307/252 J |
| 3,662,248 | 5/1972 | Amano et al...................... | 321/27 R |

*Primary Examiner*—William M. Shoop
*Attorney, Agent, or Firm*—Oblon, Fisher, Spivak, McClelland & Maier

[57] ABSTRACT

An ignition apparatus for triggering a plurality of thyristors connected in series and/or in parallel is disclosed. The apparatus includes a high frequency power source, a switch for interrupting the output of the high frequency power source, a pulse generator, a gate transformer for supplying the output of the high frequency power source and the pulse current from the pulse generator to the gate of a thyristor, and a controlling device for controlling the switching time of the switch and the time of pulse-generation by the pulse generator. The switch and the pulse generator are controlled by the controlling device so as to feed a current pulse to the gate transformer from the pulse generator before the output of the high frequency power source is supplied to the gate transformer by actuating the switch. Thus, a gate current having a fast rise time, a desirably controlled time interval and a suitable amplitude is provided supplying a large output capacity for the ignition apparatus for simultaneously triggering the plurality of thyristors connected in series and/or in parallel. This apparatus eliminates the prior art requirement for employment of separate rectangular wave AC generators for each group of thyristors having the same ignition period.

5 Claims, 12 Drawing Figures

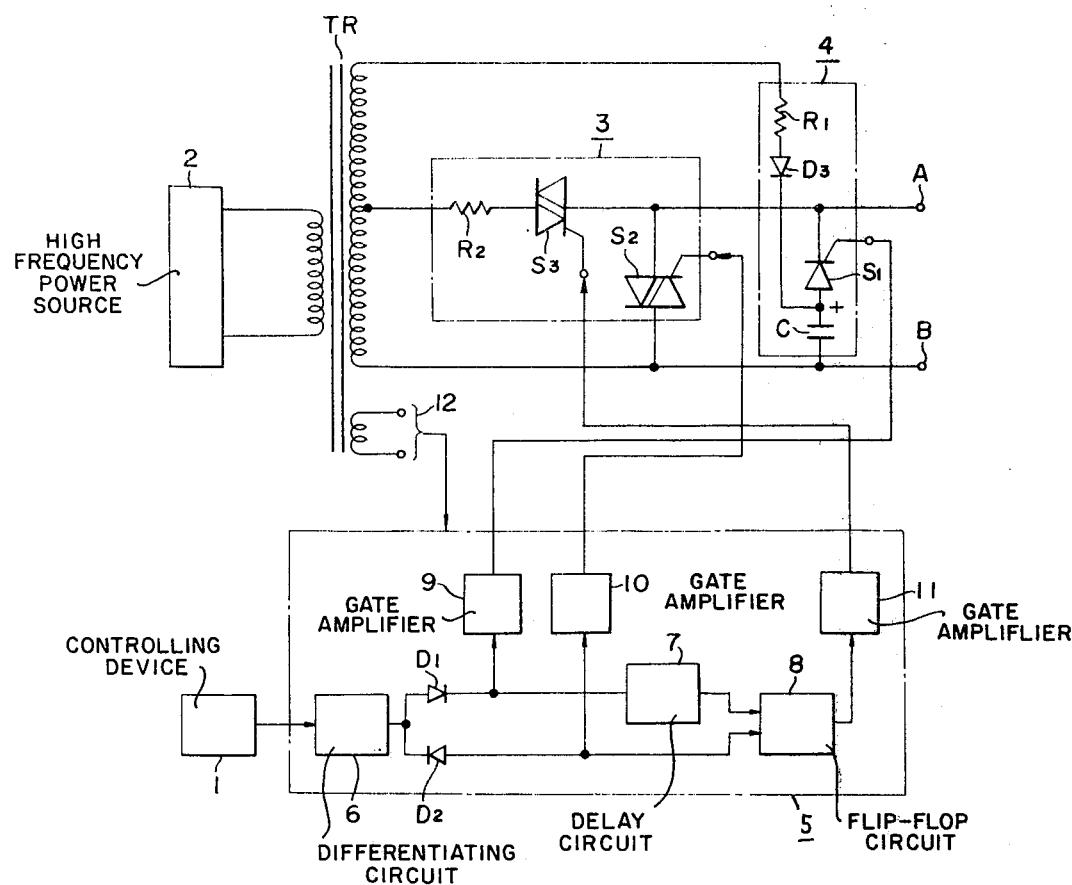
F I G. 3

IGNITION APPARATUS FOR THYRISTORS

BACKGROUND OF THE INVENTION

1. Field of the Invention:

The present invention relates to an ignition apparatus for thyristors and more particularly to an ignition apparatus for a plurality of thyristors connected in series and/or in parallel.

2. Description of the Prior Art:

Rectangular wave ignition apparatuses have been used in the past when a gate current having a fast rise time and a desirably controlled time interval is required for triggering a plurality of thyristors connected in series and/or in parallel. These rectangular wave AC generators generate a rectangular wave AC output for a predetermined period depending upon a control signal transmitted from a controlling device employing a rectangular wave AC generator, a controlling device for controlling the output period of the rectangular wave AC generator, a gate transformer and a full wave rectifying device. The rectangular wave AC output is transmitted through the gate transformer, rectified by a single phase full wave rectifying device connected to the secondary side of the gate transformer, and the resulting current is fed to the gate of one or more non-conducting thyristors.

In accordance with these rectangular wave type ingition apparatuses, the leakage inductance of the gate transformer may be decreased, the rise time of the gate current increased and the duration of the gate current interval lengthened by selecting a high output frequency for the rectangular wave AC generator. However, when a plurality of thyristors are connected in series and/or in parallel, it is not enough to feed them all simultaneously a gate current having only a high rise time because ignition characteristics of the thyristors are not uniform, and as a result an overvoltage may be applied to thyristors in the series connection of thyristors which do not immediately ignite. On the other hand, an overcurrent may also be applied initially to the first ignited thyristors in the parallel connection of thyristors. In both cases, thyristors may be damaged or destroyed, disadvantageously.

In the conventional rectangular wave AC generator, transistors or gate controlled thyristors having a relatively small current capacity are used as semiconductor elements. Accordingly, a large ignition capacity for igniting a plurality of thyristors by using only one ignition apparatus is not practical with previously known apparatuses. Thus, in the past a separate rectangular wave AC generator is disadvantageously required for each group of thyristors having the same ignition period. A need therefore exists for a novel apparatus having none of the disadvantages of the conventional apparatus.

SUMMARY OF THE INVENTION

Accordingly, it is one object of the present invention to provide an ignition apparatus for thyristors which supplies a gate current having a fast rise time and desirably controlled time interval for triggering a plurality of thyristors connected in series and/or in parallel.

It is another object of the invention to provide a novel apparatus wherein it is unnecessary to employ separate rectangular wave AC generators for each group of thyristors having the same ignition period and which easily supplies a pulse having a fast rise time and a suitable amplitude.

It is another object of the invention to provide an ignition apparatus which has a simple structure and a large capacity.

Briefly, these and other objects of the invention are achieved by the ignition apparatus of the present invention which includes a high frequency power source, a switch for interrupting the output of the high frequency power source, a pulse generator, a gate transformer for supplying the output of the high frequency power source and the pulse current from the pulse generator to the gate of a thyristor, and a controlling device for controlling the switching time of the switch and the time of pulse-generation by the pulse generator. The switch and the pulse generator are controlled by the controlling device so as to feed the pulse current to the gate transformer from the pulse generator before the output of the high frequency power source is supplied to the gate transformer by actuating the switch. A high degree of electrical insulation between the thyristors, which are at a high potential, and the high frequency power source, at ground potential, can be maintained by connecting an electrical isolation transformer between the high frequency power source and the gate transformer, by connecting the high frequency power source at the primary side of the isolation transformer and by connecting the switch, the pulse generator and the gate transformer at the secondary side. In this case, the output of the high frequency power source and the pulse current of the pulse generator are superimposed in the secondary side of the isolation transformer. Accordingly, it is unnecessary to use a special transformer for improving the rise time of the ignition pulse and a conventional isolation transformer can be used. The pulse generator can be a combination of at least a condenser and a switching element, is charged by the output of the high frequency power source during the off time interval of the switching element and is discharged by turning on the switching element, whereby the pulse current is fed to the gate transformer. The switch for intermittently connecting the switching element can be a unilateral electronic switch, and the switch for intermittently connecting the output of the high frequency power source can be a bilateral electronic switch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic circuit diagram of another embodiment of the present invention;

DETAILED DESCRIPTION OF THE PREFERRED EMBODIMENTS

Figure 1:
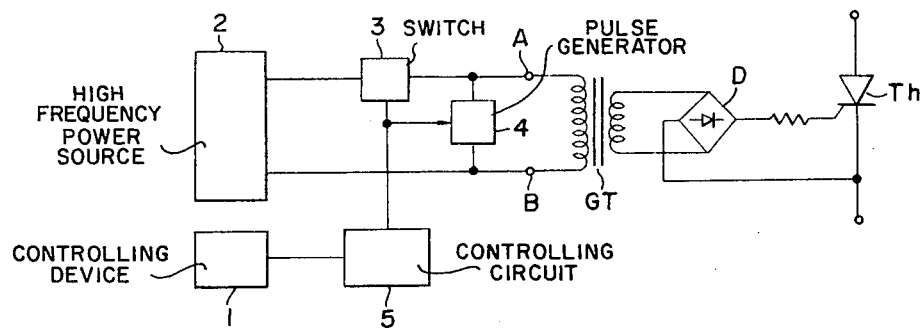
FIG. 1 is a schematic circuit diagram of one embodiment of the present invention.

Referring now to the Drawings, wherein like reference numerals designate identical or corresponding parts throughout the several views, and more particularly to FIG. 1 thereof, the ignition apparatus of the present invention comprises a high frequency power source 2 continuously generating an output connected to a switch 3 for intermittently supplying the output of the high frequency power source to a gate transformer GT. A pulse generator 4 is provided for feeding a pulse current having a fast rise time to the gate transformer GT before the output of the high frequency wave power source 2 is applied. A controlling circuit 5 is provided for actuating the switch 3 and the pulse generator 4 in a predetermined order corresponding to the control signal transmitted from a controlling device 1.

Figure 2:
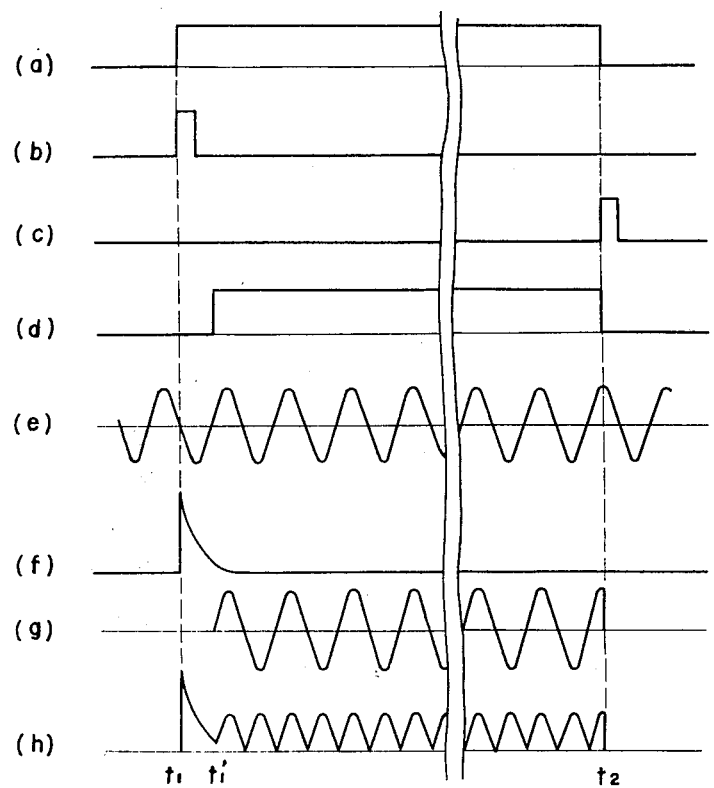
FIGS. 2a through 2h show various wave-form characteristics of the circuit of the present invention.

FIG. 2 shows wave-forms illustrating the operation of the apparatus of FIG. 1. In particular, FIG. 2a shows the control signal for indicating application of the gate current to the thyristor. Th in the time period from $t_1$ to $t_2$. This signal can also be ON and OFF pulse signals for indicating the time $t_1$ and the time $t_2$, as shown in FIGS. 2b and 2c. FIG. 2d shows a signal indicating the ON state of the switch 3, while FIG. 2e shows the output of the high frequency power source 2. FIG. 2f shows the output pulse generated by the pulse generator 4 and FIG. 2g shows the intermittent output of the high frequency power source 2 converted by the switch 3. FIG. 2h shows the gate current which is a rectified full wave signal in which both of the waves shown in FIGS. 2f and 2g are combined through the gate transformer GT.

During ignition, a pulse having a sufficiently fast rise time and a sufficient amplitude is transmitted from the pulse generator 4 at the time $t_1$, and then the switch 3 is turned on at the time $t'_1$ which is slightly later than $t_1$, and is turned off at the time $t_2$. The output of the high frequency power source 2 can be any wave-form, such as rectangular waveform, and the frequency is usually between several hundreds and several tens of KHz, in practice.

In accordance with the invention, it is unnecessary to connect a rectangular AC generator to each group of thyristors having the same ignition period, as is required in the conventional apparatus. Moreover, it is possible using the present invention to supply a pulse having a sufficient rise time and amplitude for simultaneously igniting a plurality of thyristors connected in series and/or parallel.

In accordance with the invention, a gate pulse of the required time interval is generated by the combination of the switching of the high frequency power source and the single pulse, so that there is no difficulty in providing a large output capacity for the ignition apparatus.

Another embodiment of the invention will now be described. FIG. 3 is the electrical circuit diagram showing the more important aspects of this other embodiment of the invention, which comprises a transformer TR, a unilateral electronic switch $S_1$ such as a SCR, a pair of bilateral electronic switches $S_2$, $S_3$ such as bidirectional triode-thyristors; diodes $D_1$, $D_2$, $D_3$; a capacitor C, resistors $R_1$, $R_2$; a differentiating circuit 6, a delay circuit 7, a flip-flop circuit 8 and gate amplifiers 9, 10, 11. The reference numerals 1, 2, 3 designate the same components as in FIG. 1.

Referring to the wave-forms of FIG. 2, the operation of the embodiment of FIG. 3 will now be described in detail. The control signal of FIG. 2a transmitted from the controlling device 1 is differentiated by the differentiating circuit 6 and is then divided into the ON and OFF signals shown in FIG. 2b, c, by the diodes $D_1$, $D_2$. The ON signal is rectified and amplified to a desirable wave-form by the gate amplifier 9 and the OFF signal is rectified and amplified to a desirable wave-form by the gate amplifier 10, and then is transmitted to the unilateral electronic switch $S_1$ or to the bilateral electronic switch $S_2$.

The output of the flip-flop circuit 8, to which both the OFF and ON signals delayed through the delay circuit 7 are transmitted as inputs, that is, the signal of FIG. 2d is rectified and amplified to a desirable wave-form by the gate amplifier 11 and is transmitted to the bilateral electronic switch $S_3$. Accordingly, the electronic switches are actuated in the order $S_1$, $S_3$, and $S_2$ upon ignition, whereby the capacitor $C_2$ charged to a desirable voltage from the transformer TR through the charging resistor $R_1$ and the charging diode $D_3$, is discharged at the time $t_1$ to form the pulse. The bilateral electronic switch $S_3$ is turned on at the time $t_1'$. The high frequency power source 2 is connected through the transformer TR and finally the bilateral electronic switch $S_3$ is turned off at the time $t_2$, and simultaneously the bilateral electronic switch $S_2$ is turned on and the final half cycle of the high frequency power source 2 is by-passed to accomplish the operation of one cycle of the ignition circuit. It is noted that it is not always necessary to use the bilateral electronic switch $S_2$ for the by-passing.

When the bilateral electronic switch $S_3$ is formed of semiconductor elements having a self-sustaining function such as SCRs reversely connected or bidirectional triode-thyristors, the final half cycle of the high frequency power source 2 remains, whereby it is effective in the case of a relatively low frequency output of the high frequency power source 2 or in the case of determining a precise end to the ignition pulse, in comparison with those of the operation cycle of the ignition circuit. The resistor $R_2$ is a limit resistor for short-circuit current, in that case.

The electrical isolation transformer TR is provided not only to transform the high frequency power source 2 but also to keep a good electrical insulation between the thyristors, which are at a high potential, and the high frequency power source at ground potential. In general, when the pulse wave-form is transmitted by the electrical isolation transformer, wave-form distortion is caused due to an increase in the electrical effect of the isolation transformer.

In accordance with the invention, the pulse current is generated in the secondary side of the isolation transformer, and the pulse current is super-imposed on the output of the high frequency power source. Accordingly, it is not necessary to use a special isolation transformer having special characteristics for the rise time of the ignition pulse. It is possible to use a conventional isolation transformer. The auxiliary coil 12 is connected to the controlling circuit 5 for supplying desirable power.

Figure 4:
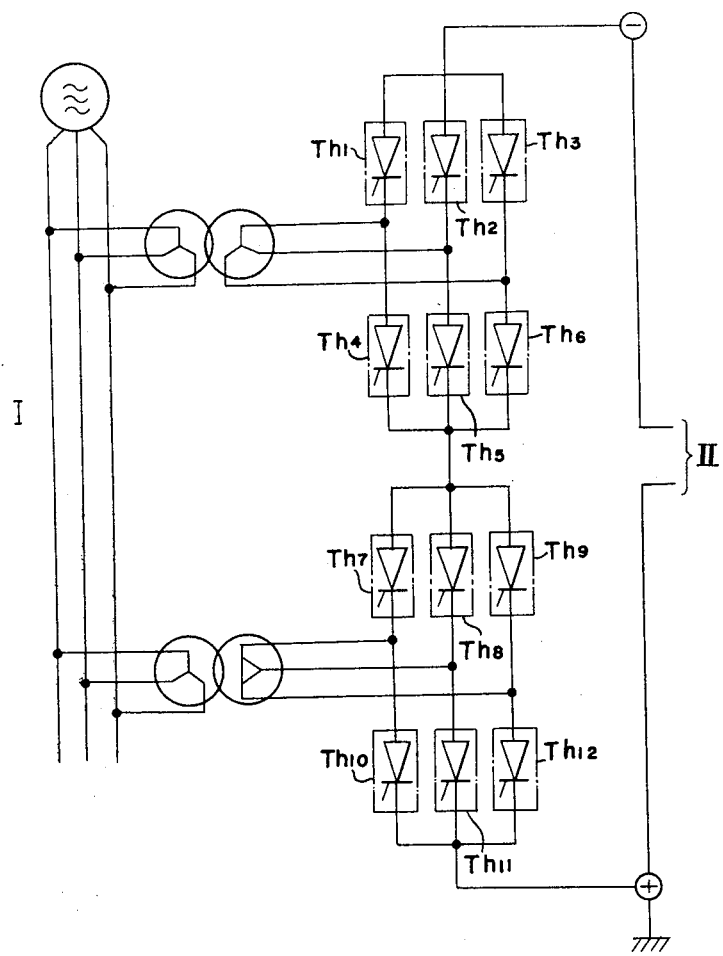
FIG. 4 is a schematic circuit diagram of a typical AC-DC converter for supplying a HVDC output illustrating one application of the present invention and, FIG. 5 is a partial schematic circuit diagram showing in greater detail the more important parts of the converter of FIG. 4.

FIG. 4 shows a typical example of an AC-DC converter for supplying a HVDC output, which is one of the best applications of the present invention. In FIG. 4, more than 100 thyristors must be connected in series, as each thyristor arm $Th_1 - Th_{12}$ is operated by applying voltage greater than 100 KV. Each thyristor arm must be kept at a different potential in its insulating or non-conducting state. It is noted that the numeral I designates an AC system and II designates a DC system.

Figure 5:
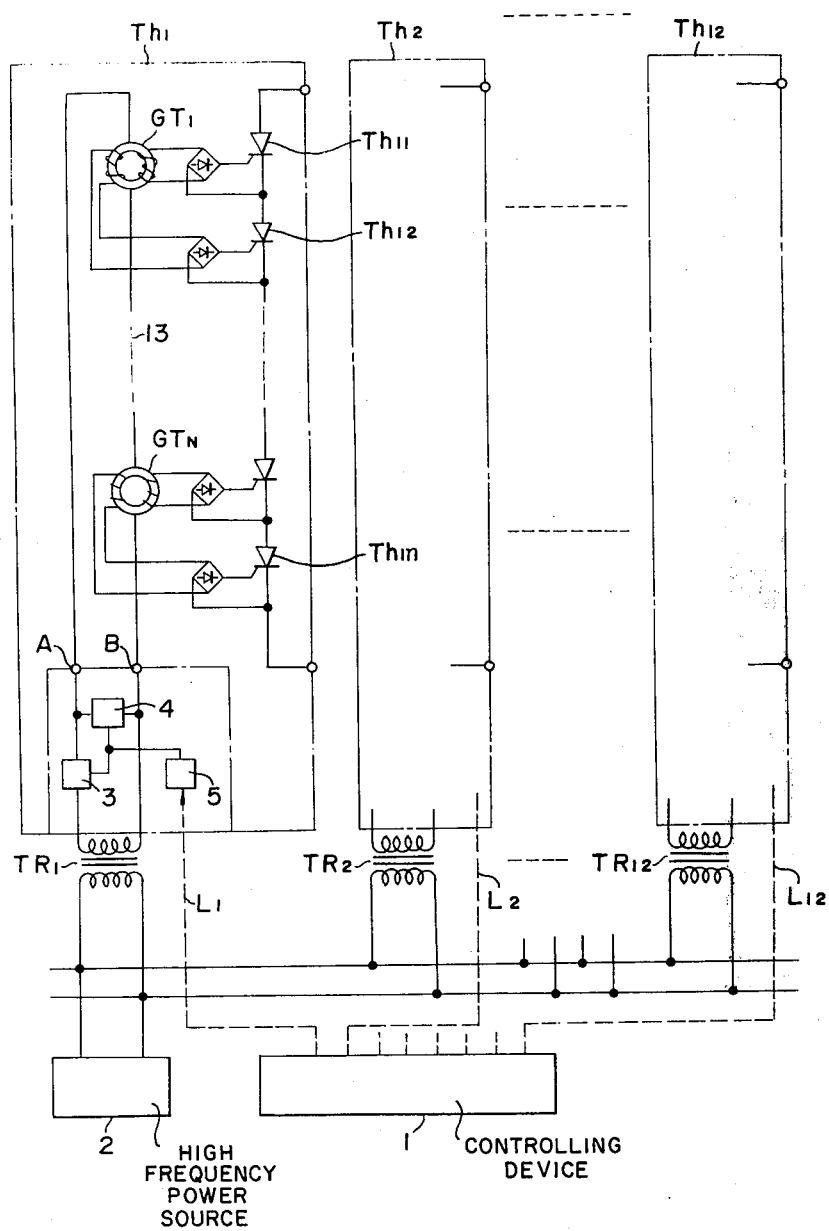

FIG. 5 shows the electrical circuit diagram of the most important portion of a circuit wherein the invention is applied for the thyristor arms $Th_1$–$Th_{12}$. In FIG. 5, $TH_{11}$ – $Th_{1n}$ designate $n$ thyristors connected in series, $GT_1$ – $GT_N$ designate the conventional CT type gate transformers deposed on an insulated common primary conductor 13 with equal linear spacing. $TR_1$ – $TR_{12}$ designate isolation transformers for supplying high frequency power which respectively have a sufficient insulation as required for each thyristor arm $Th_1$ – $Th_{12}$, $L_1$, – $L_{12}$ designate signal transmission paths for transmitting control signals from the controlling device 1 to each thyristor arm $Th_1$ – $Th_{12}$ when in the non-conducting state. In high voltage apparatuses of the type illustrated, signal transmission by light waves is best for obvious reasons.

As illustrated, in accordance with the invention, a pulse having a sufficiently fast rise time and a sufficiently high amplitude can be fed to the gate just before the output of the high frequency power source is supplied to the gate of the thyristor, whereby a plurality of thyristors can be simultaneously ignited. Accordingly, the present invention provides an ignition apparatus for thyristors which provides satisfactory gate insulation, provides a gate pulse having a long interval and permits simultaneous ignition for triggering a high voltage, large capacity thyristor system such as an AC-DC converter for supplying a HVDC output.

In the illustrated embodiment, the thyristor arms have 12 thyristors, although it is possible to select any number of thyristors.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ignition apparatus for triggering a plurality of thyristros connected in series and/or parallel, each having a gate electrode and an ignition period, comprising:
    a high frequency power source,
    switch means for interrupting the output of said high frequency power source,
    gate transformer means for supplying the output of said high frequency power source interrupted by said switch means to at least one of said gate electrodes,
    pulse generator means for feeding a current pulse having a fast rise time to said gate transformer means; and,
    control means for controlling the switching time of said switch means and for controlling the output of said pulse generator means to generate a current pulse from said pulse generator to be fed to said gate transformer slightly before the output of said high frequency power source is applied to said gate transformer means to provide a large output capacity for the ignition apparatus to simultaneously ignite the plurality of thyristors connected in series and/or parallel and to eliminate the need to connect a rectangular AC generator to each group of thyristors having the same ignition period.

2. An ignition apparatus according to claim 1, wherein:
    an electrical isolation transformer is connected between said high frequency power source and the gate transformer, and wherein said high frequency power source is connected to a primary circuit of said electrical isolation transformer and said switch means and said pulse generator means are connected to a secondary circuit thereof.

3. An ignition apparatus for triggering a plurality of thyristors connected in series and/or parallel, each having a gate electrode and an ignition period comprising:
    an electrical isolation transformer having a primary and a secondary circuit,
    a high frequency power source connected to said primary circuit;
    switch means for interrupting the output of said high frequency power source, said switch means connected to said secondary circuit,
    a series of capacitors and switching elements connected across said secondary circuit,
    a diode connected to at least one of said capacitors and to at least one of said switching elements, and to said secondary circuit for charging said capacitor when said switching element is in its off state,
    gate transformer means for supplying a discharge pulse from said capacitor, in addition to the output of said high frequency power source, to a gate electrode of at least one thyristor, and
    control means for controlling the time for switching said switch means and said switching elements to generate a discharge pulse from said capacitor to be fed to said gate transformer slightly before the output of said high frequency power source is applied to said gate transformer means to provide a large output capacity for the ignition apparatus to simultaneously ignite the plurality of thyristors connected in series and/or parallel and to eliminate the need to connect a rectangular AC generator to each group of thyristors having the same ignition period.

4. An ignition apparatus according to claim 3 wherein:
    said switch means is a bilateral electronic switch and said switching elements are unilateral electronic switches.

5. An ignition apparatus for thyristors, each having gate electrodes, comprising:
    an electrical isolation transformer having a primary and a secondary circuit,
    a high frequency power source connected to said primary circuit;
    switch means for interrupting the output of said high frequency power source, said switch means connected to said secondary circuit,
    a series of capacitors and switching elements connected across said secondary circuit,
    a diode connected to at least one of said capacitors and to at least one of said switching elements, and to said secondary circuit for charging said capacitor when said switching element is in its off state,
    gate transformer means for supplying a discharge pulse from said capacitor, in addition to the output of said high frequency power source, to a gate electrode of at least one thyristor, control means for controlling the time for switching said switch means and said switching elements, and said switch means is a bilateral electronic switch and said switching elements are unilateral electronic switches.

* * * * *